Feb. 19, 1924.

F. KOHNLE

TAG MARKING MACHINE

Filed Sept. 27 1922 7 Sheets-Sheet 4

1,484,136

Inventor:
Frederick Kohnle

Word & Word
By
Attorney

Feb. 19, 1924.

F. KOHNLE

TAG MARKING MACHINE

Filed Sept. 27, 1922 7 Sheets-Sheet 5

Feb. 19, 1924.

F. KOHNLE

TAG MARKING MACHINE

Filed Sept. 27, 1922

Inventor: Frederick Kohnle

By Word & Word

Attorneys

Feb. 19, 1924.

F. KOHNLE

TAG MARKING MACHINE

Filed Sept. 27 1922      7 Sheets-Sheet 7

1,484,136

Patented Feb. 19, 1924.

1,484,136

UNITED STATES PATENT OFFICE.

FREDERICK KOHNLE, OF DAYTON, OHIO, ASSIGNOR TO THE MONARCH MARKING SYSTEM COMPANY, OF DAYTON, OHIO, A CORPORATION OF OHIO.

TAG-MARKING MACHINE.

Application filed September 27, 1922. Serial No. 590,796.

*To all whom it may concern:*

Be it known that I, FREDERICK KOHNLE, a citizen of the United States, and residing at Dayton, in the county of Montgomery and State of Ohio, have invented a new and useful Improvement in Tag-Marking Machines, of which the following specification is a full disclosure.

The invention relates to a machine for printing and cutting tickets, pin-tags, and gummed labels, introduced into the machine in strip form, the tag or label widths or lengths being defined by spaced openings or slots, which openings or slots function as supplementary means for feeding said tags or labels to printing and cutting positions.

This machine is designed to feed, print and cut price marking tags or tickets in strip form, and of varying widths and styles, and to similarly operate upon, paper ribbon, the said tickets, or strips, and ribbon having openings or slots therein, as supplementary feeding means, spaced conformably to the desired tag or label width or length, two distinct styles of strips and labels being fed, printed and cut, independently of one another.

An object of the invention is to provide a machine for feeding, printing, and cutting paper material in the form of both cardboard strips and paper ribbon, and to provide means whereby each style of strip material may be separately fed to and disposed upon a common printing platen, upon which platen the material is simultaneously printed and cut in tag lengths.

Another object of the invention is to provide means whereby the mechanism for feeding one type or kind of material may be conveniently connected or disconnected with the mechanism for feeding the other type of material.

An additional object of the invention is the provision of means for coupling and uncoupling one of the feed mechanisms whereby it can be made to function only when desired, said coupling means also functioning to operate a counting device to cause registration of the number of machine operations indicative of the number of tags printed.

Another object of the invention is the provision of feed means, each adapted for feeding its type of material, said means coordinately actuated in such a manner that the relative feed strokes thereof are in opposite phases, that is, one of the feed devices advances while the other retreats.

Another object of the invention is to provide a printing head having cutting means thereon coactible with companion knives attached in a right angular relation at the side of the platen, the cutting means operated and supported by the printing head.

Another object of the invention is to provide a cam in the form of a stamped sheet metal wheel structure for operating the feeding, printing, and inking mechanism in timed coordination.

Another object of the invention is to provide a novel means for guiding paper ribbon to prevent buckling of the same and to further the positive engagement of the feeding means with the paper.

Another object of the invention is the provision of a compact machine constructed principally of stamped sheet metal, thus reducing the cost of manufacture as well as the weight of the machine.

Other objects and certain advantages will be more fully set forth in a description of the accompanying drawings forming a part of this application, in which.

All elements of the machine are supported upon a base 1, in the form of a skeleton box-like casting, providing a horizontal bearing 2 for an operating shaft 3, rotatable by a suitable hand-wheel 4. The base is provided at its top with a horizontal table portion, generally designated at 5, presenting the plane surfaces 6, 7, 8, upon which various elements of the machine are suitably mounted and attached, as hereinafter described.

A horizontal bearing 9 for the journal of the printing lever is provided in an extension of the table, said bearing lying above and beyond the same between the surfaces 6 and 7, and at a right angle to the bearing 2. The table is notched, as at 10, adjacent the extension to allow clearance for an oscillating printing arm, journaled in said bearing and extending above and across the table from the rear to the front thereof. Centrally of the table is a longitudinal channel 11 for housing the ticket strip guide and tension means.

Extending downwardly from the channel 11 adjacent one wall thereof is a slot 12 within which a feed dog is designed to reciprocate. A rubber platen 13 is held in a recess at one end of and flush with the surface 8, said platen being positioned substantially at one corner of the table, so that either the cardboard tag strip or gummed ribbon can contact the same and be fed thereacross. Keyed to the shaft 3, at the rear of the base 1, is a cam wheel 15, which is slightly spaced from the base to allow for the reciprocation of a feed lever, between said wheel and base, the lever being connected with and operable by the cam wheel.

*Feed and feed actuation.*

Figure 15:
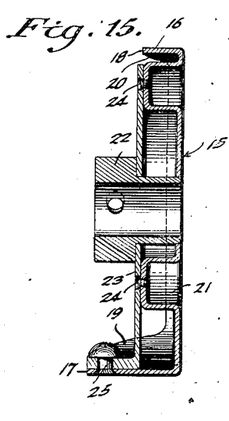
Figures 15 and 16 are diametric sections of the cam wheel, respectively on lines 15—15, 16—16, of Figure 2.
Figure 16:
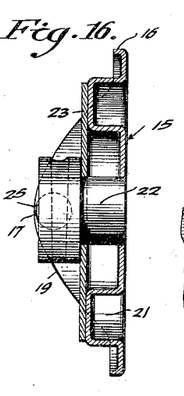
Figure 19:
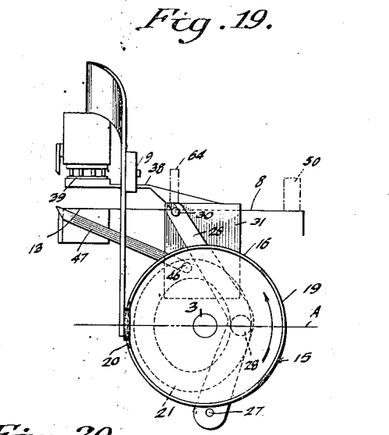
Figure 19 is a diagrammatic elevation illustrating the position of the elements, including the cam wheel, feed pawl, printing-head, and printing pad, when the machine is feeding a cardboard ticket strip.

The cam wheel 15 rotates in a vertical plane and provides a horizontally disposed roller engaging flange 16 the outer periphery of which engages a terminal roller of the printing lever. The flange is increased in width at certain portions of the periphery to provide diametrically related peak portions 17, 18, of relatively different heights providing symmetrical inclines at each side thereof merging into the narrower portion of the flange, thus providing cams 19, 20, the higher of which, 19, is designed to operate the printing lever for printing and cutting operations and the lower, 20, for inking operations. (See Figures 19, 20.) The cam wheel further provides in its face side opposite that of the cams 19, 20, an elliptical groove 21 with which is engaged the roller of the feed lever, said groove functioning to reciprocate through the intermediary of said lever the inking pad arm and both feed dogs. The major axis of the elliptical groove 21 is disposed at a right angle to a diametric line A (see Figures 19, 20), drawn through the peak portions 17, 18, of the cams 19, 20, and eccentric to the axis of the shaft 3 and between said axis and the cam 19, the minor axis of the groove being parallel with said diametric line A. The cam wheel is punched and formed from a blank of sheet-metal to provide the flange 16 and groove 21, the stamping as thus formed being mounted, as shown in Figures 15 and 16, upon the counterturned portion of the hub 22, a reenforcing plate 23 being disposed upon said counterturned portion between and against the shoulder formed thereby and also against the outer face of the cam wheel, said plate being riveted or otherwise secured as at 24 to said outer face of said wheel, and additionally secured by an outturned portion attached as at 25 to the cam 19. A feed lever 26, and printing lever 135 are actuated respectively by means of the elliptical groove 21, and cams 19 and 20 during the cam wheel rotation. The feed lever, slidingly disposed against the rear vertical face of the base 1, is pivoted thereto at 27, and lies between the cam wheel and said base. The lever is shaped to provide, midway of its length and at that side adjacent the shaft 3, a re-entrant angle, to allow clearance between the said lever and shaft 3 during lever reciprocation. A roller 28 projects horizontally from the lever to engage the groove 21. The upper end of the lever is slotted as at 29 for sliding engagement within a headed pin 30 projecting from the vertical face of the slide member, generally designated 31, designed to slide upon an angle plate 32 to which it is slidingly attached by a pin or rivet 33 traversing a slot 34 in plate 32 the rivet being fastened to an upturned portion 35 of the slide 31, which portion lies at the rear of and against the vertical portion of the plate 32, said plate 32 being attached by screws to the surface 7 and having a raised apron portion 36 covering the channel 11 with the lower edge of the outer downturned end 37 of said apron, sufficiently vertically spaced from the surface 8, adjacent the channel 11 to allow the introduction of the cardboard strip between said surface and the downturned edge of said apron, as hereinafter more fully described.

The slide member 31 is formed from a sheet-metal blank, bent to provide a horizontal inking pad arm 38 slidable upon a plate 32 and extending diagonally across the table 5, having an inking pad 39 mounted at its outer end, said pad aligned with the platen 13 designed to lie thereabove while the type are lowered to contact the pad in an inking operation. The member 31 further provides a longitudinal shelf portion 40 underlying the table 5 and extended inwardly thereunder to a point vertically beneath the slot 12. Adjustably attached to the upper surface of the shelf 40 by a screw 41 traversing slot 42 is an angle plate 43 providing downturned retaining lug 44 engaging the side of the opening 45, of said shelf 40. Upon the vertical surface of the angle plate 43 is pivoted, as at 46, a spring actuated feed dog or pawl 47 extending upwardly through the slot 12, its upper end projecting slightly above the surface 8 of the table (see Fig. 9) to engage the slots of the tag strip for feeding the said strip, a stop 48 limiting the upward movement of the said pawl. The spring 49 is attached to an outturned end of the pawl and to a stamped-out projection of the plate 43. Upon the upper side of the plate 32 adjacent the outer end thereof is an upstanding pin 50 providing a counterturned portion upon which is pivotally fastened one end of an auxiliary feed lever 52 designed to actuate the paper ribbon feeding mechanism to which the lever is connected by means of a slot 53 in its end, engaging a headed pin 54 (see Fig. 5) mounted upon the feed pawl carrier 55, to which in turn is pivoted the pawl or dog 56 for feeding the paper ribbon.

Figure 3:
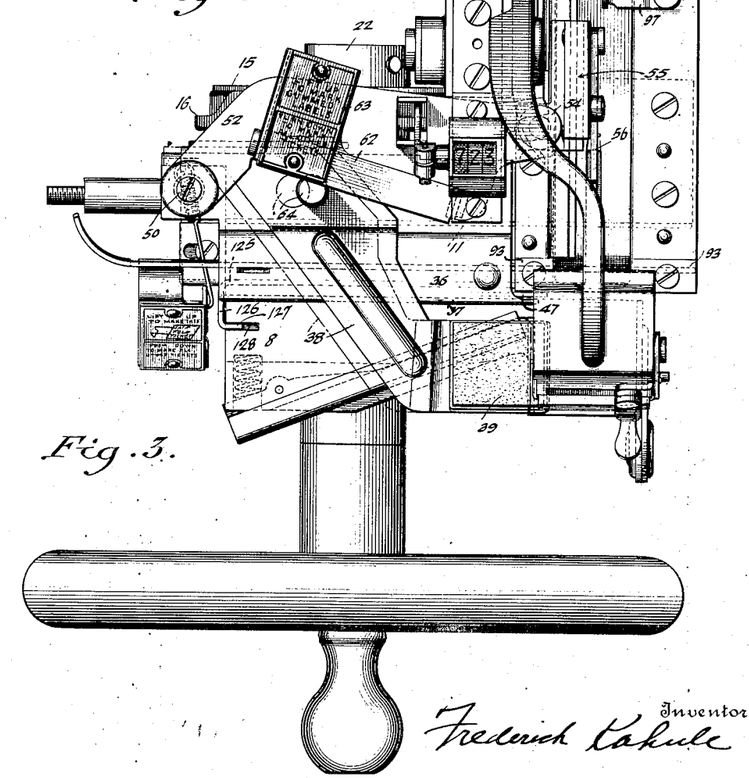
Figure 3 is a top plan, the position of the parts being shown in correspondence with Figures 1 and 2, and also showing in dot-and-dash lines the fully retarded position of the inking pad arm.
Figure 5:
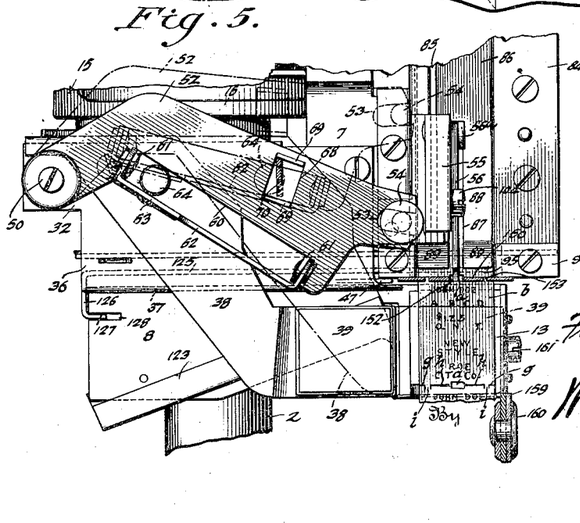
Figure 5 is a fragmentary plan showing the auxiliary feed lever connected for feeding paper ribbon with the parts positioned in correspondence to those of Figure 4, the forward position of the inking pad and retracted position of the ribbon feed-pawl being shown in dot-and-dash lines.
Figure 6:
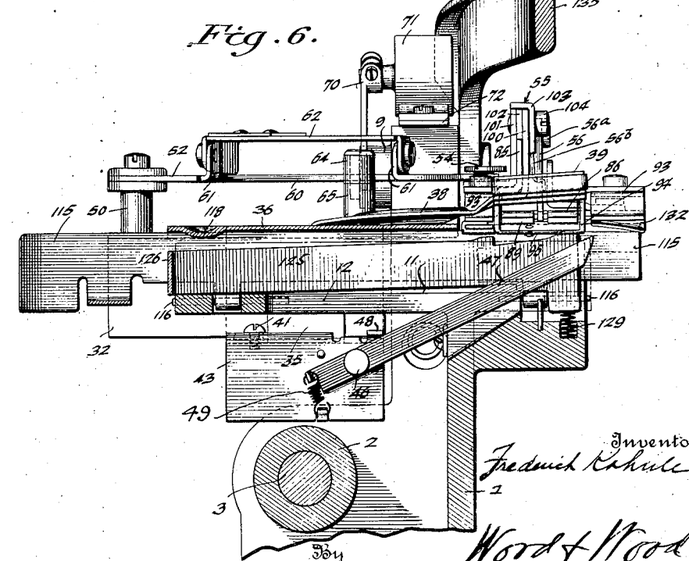
Figure 6 is a longitudinal vertical section through the tag strip handling side of the machine, illustrating the feed dog and inking pad in advanced position, and showing the operative positions of the tension device and adjustable guide plate.

A latch means is provided for coupling the lever 52 with the slide member 31 to cause an oscillation of the said lever and consequent actuation of the feed pawl carrier 55, a description of which follows:

The face configuration of the lever 52 is best shown in Figures 3 and 5, wherein the forward edge of the same is shown to provide a re-entrant angle, at one side of which is provided an elongated notch 60 at all times lying at an angle to the long axis of the table and to the direction of reciprocation of the arm 34. Upstanding lugs 61 are provided at the ends of the notch to which is attached a swinging latch or wall forming element 62, the down-turned terminal lugs of which are pivotally riveted to the lugs 61, a finger-piece 63 being provided for raising the latch member about its pivot to a position shown in Figure 5, as a result of which adjustment a vertically disposed wall is provided, which in conjunction with the notch 60 forms a closed slot about the roller 64, mounted upon a pin 65 attached to the arm 38. The adjustment just described is made when a feed of the paper ribbon is desired, the roller 64 slidingly engaging the inner vertical face of the latch element 62 and edge of the notch 60 to oscillate the lever 52 as the slide 31 is reciprocated.

A counting device for registering the number of machine operations is actuated by the auxiliary feed lever 52 which provides a slot 68 having upstanding end lugs 69, said lugs and slot being slidingly engaged with the lower end of the counter lever 70, attached to the shaft of the counting device 71 of any preferred form, mounted upon a shelf 72, fastened upon and projecting forwardly from the extension carrying the bearing 9. The counting device is operated whenever the latch member 62 is swung downwardly to engage the roller 64, the feed dog for the paper ribbon being also actuated as before described.

Figure 20:
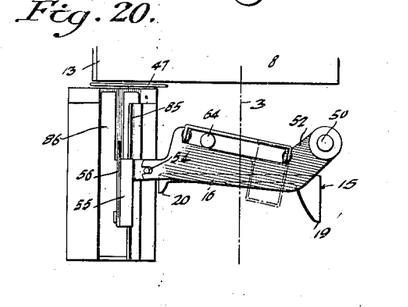
Figure 20 is a diagrammatic plan showing the corresponding position of the auxiliary feed lever relative to the position of the parts of Figure 19, when said lever is adjusted for feeding the paper ribbon.
Figure 21:
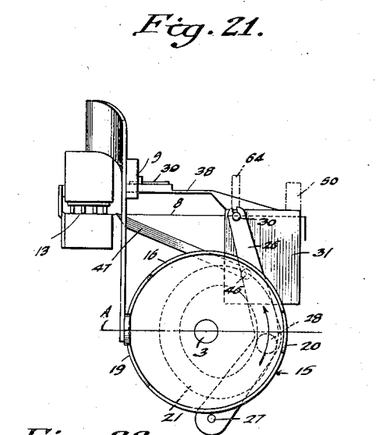
Figure 21 is a diagrammatic view showing the principal elements, including the cam, feed pawl and printing-head disposed as when a ticket strip is being printed and cut.
Figure 22:
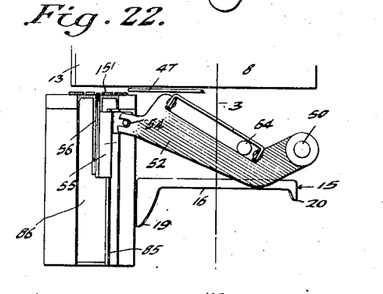
Figure 22 is a diagrammatic plan illustrating the forward position of the auxiliary feed lever when said lever is adjusted for feeding paper ribbon in correspondence to the position of the parts of Figure 21.
Figure 23:
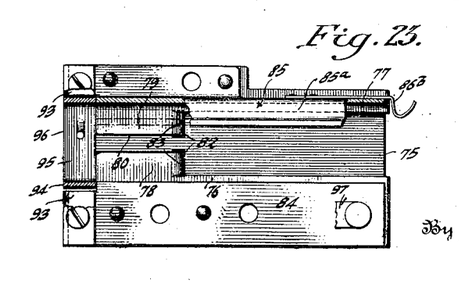
Figure 23 is a plan section of the paper ribbon guide means, with feed pawl carrier and tension plate removed.

Both pawls move simultaneously upon oscillation of the lever 52, the angular relation of the notch 60 to the path of movement of the roller 64 being such that when one pawl is advanced the other is retracted, (see Figs. 20, 22). Inasmuch as one type of s rip only is fed at a time, the lever 52 need only be connected by the latch 62 to the roller 64 when paper ribbon is being fed or when a record of the number of machine operations for feeding cardboard strips is desired, both objects being accomplished whenever the lever 52 is oscillated.

As before stated, the feed dogs operate in directions at right angles to each other, the platen being so positioned with respect thereto that both cardboard strip and paper ribbon rest upon the platen during the respective printing and cutting operations. Novel guide means are provided respectively for the cardboard strips and paper ribbon, the ribbon guide being constructed in the following manner.

Paper ribbon guide.

Referring particularly to Figs. 3, 4, 12, and 13, the guide is shown in the form of a laminated sheet-metal structure attached as a unit upon the surface 6 as by screws, and comprises a base plate 75, (see Figs. 12, 13), of relatively thin material to which are riveted in spaced relation, metal plates 76, 77, upon which the paper ribbon rests. The plates are formed and positioned to provide inwardly directed lateral extensions 78, 79, defining together with the upper surface of the plate 75, a forwardly disposed relatively narrow groove 80 in which the pawl is designed to travel when engaged through a feed opening a of the paper ribbon b, said ribbon resting upon and bridging the two plates 76, 77, throughout their length.

The rear ends of the extensions 78, 79, are bent downwardly into openings 82 of the plates to form inclines 83. Over the plate 76 is longitudinally disposed a guide plate 84, which plate, together with an L-shaped element 85 attached at the opposite side to the upper surface of plate 77, form a paper ribbon guide, said L-shaped element also forming a longitudinal guide or slide and feed dog carrier support. Between the guide thus formed and extending the full length of said guide and adapted to rest on the top of the ribbon (see Fig. 12) is a tension plate 86 designed to prevent buckling and retrograde movement of the ribbon when the feed dog is being retracted, said plate having formed at its forward end a centrally disposed slot 87, two arms 88 being thereby provided on either side, having their ends bent downward at a slight angle, as at 89, to direct the paper downwardly toward the platen in conformity to the inclination of the lower or stationary knife member herebelow described.

The ends of the arms 88 are notched on their under side, as at 90, (see Figs. 10 and 11), to form a guide groove for the ribbon, to prevent lateral play of the same. The metal at the closed end of the slot 87, is pressed downwardly to form a central finger 91 designed to lie at the rear and adjacent the inclinations 83 for the purpose of depressing the ribbon at this point for positive engagement by the pawl with an opening a during a feeding operation. The forward ends of the plate 84 and the attaching flange of element 85 are bent upwardly and then horizontally to form attachment ears 93 to which are fastened the ends of the stationary cutter element 94, the middle horizontal portion 95 of which is depressed and lies flush at its inner edge with the upper surface of plate 75, slanting downwardly therefrom to a point to the rear of and above the surface 8 and adjacent the plates 13, allowing sufficient clearance for the dog 47 to pass thereunder, an outer cutting edge 96 being provided, with which a resilient movable cutter element or knife cooperates.

The tension element has at its rear an upturned finger-piece 86$^a$ engaged by a retaining spring 86$^b$ fastened to and projecting rearwardly beyond the end of the element 85. The plate is held against upward displacement at its rear end by a pivoted latch 97 having an upturned end forming a finger-piece. The feed dog carrier 55 slides upon the upper edge of the L-shaped element 85 and is formed of two L-shaped metal plates 100, 101, riveted to a spacer plate 102. The horizontal legs 98, 99, of the plates lie slidingly against and respectively at opposite sides of a horizontal portion 85$^a$ of the element 85, the leg 98 carrying the headed pin 54. An angularly bent pawl supporting plate 103 is adjustably attached at the top of the carrier by means of a screw 104 traversing a slot 105 in the plate 103. The pawl 56 is pivoted at 56$^a$ and is held in depressed position by a spring 56$^b$, one end of which is fastened to the edge of the plate 103 and the other hooked into a slot of the pawl.

Figure 2:
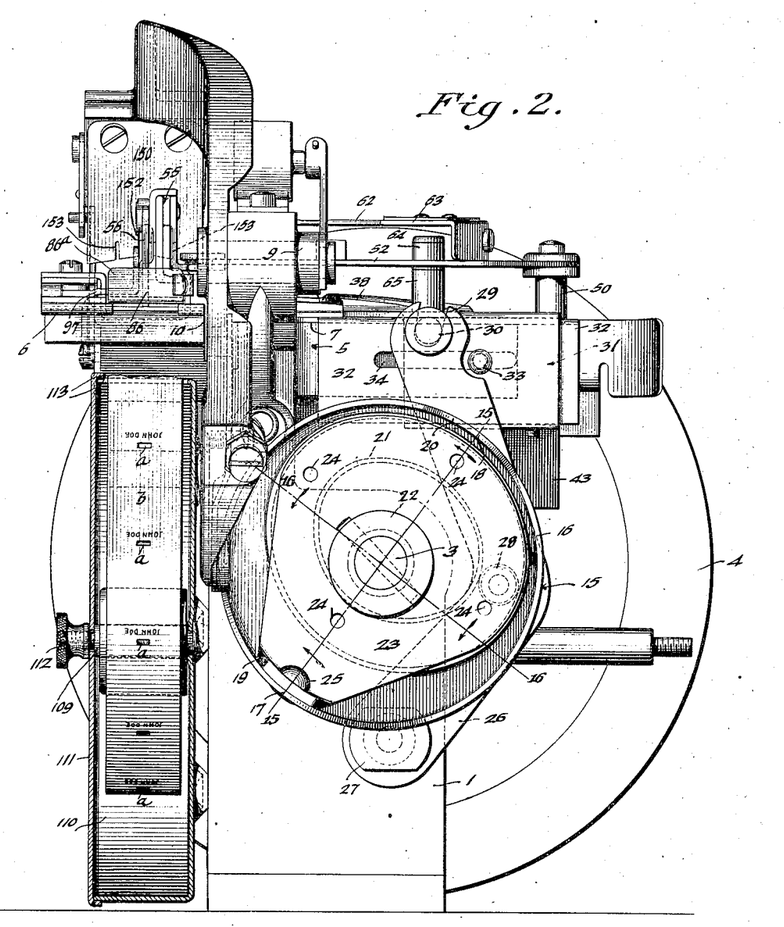
Figure 2 is a rear elevation, the parts being positioned as in Figure 1, with the casing or housing for the paper ribbon roll or reel, in section.
Figure 4:
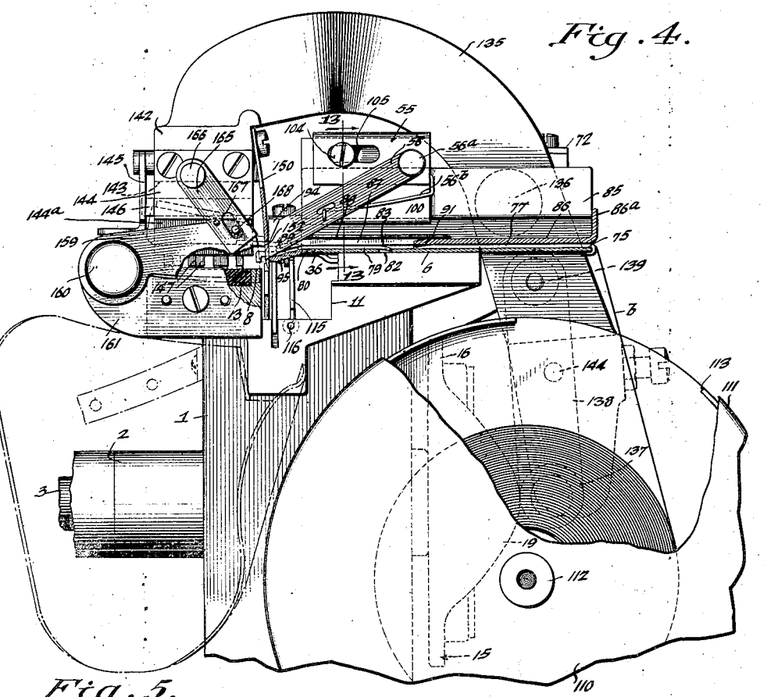
Figure 4 is a sectional elevation from the paper ribbon handling side of the machine, showing the relative positions of the feed dog, the cardboard strip and paper ribbon cutters, and printing head during a printing operation, and showing in dot-and-dash lines the position of a sheet-metal member designed to guide the unsevered strip or ribbon after partial cutting.

As shown in Figures 2 and 4, the paper ribbon b is wrapped about a wooden core to form a coil or reel, the core being rotatively mounted upon a central horizontal projection 109 of the circular metal housing 110 attached at one side of the base 1 below and in vertical alignment with the paper ribbon guide means. The housing is provided with a cover 111 held closed by a nut 112 engaged with threads of projection 109. An opening 113 is provided at the upper part of the housing through which the end of the ribbon is passed and drawn upwardly and across the guide preparatory to feeding. To place the ribbon in feeding position, the tension plate 86 is removed and the ribbon pulled upwardly, laid within the groove of the guide and drawn thereacross a sufficient distance to dispose an opening $a$ in the strip, forwardly of the feed dog 56 when the same is in retracted position. The tension plate 86 is then placed upon the strip and between the guide and yieldably locked at its rear end by latch 97, providing a gravity tension on the ribbon.

*Cardboard ticket strip guide.*

Figure 1:
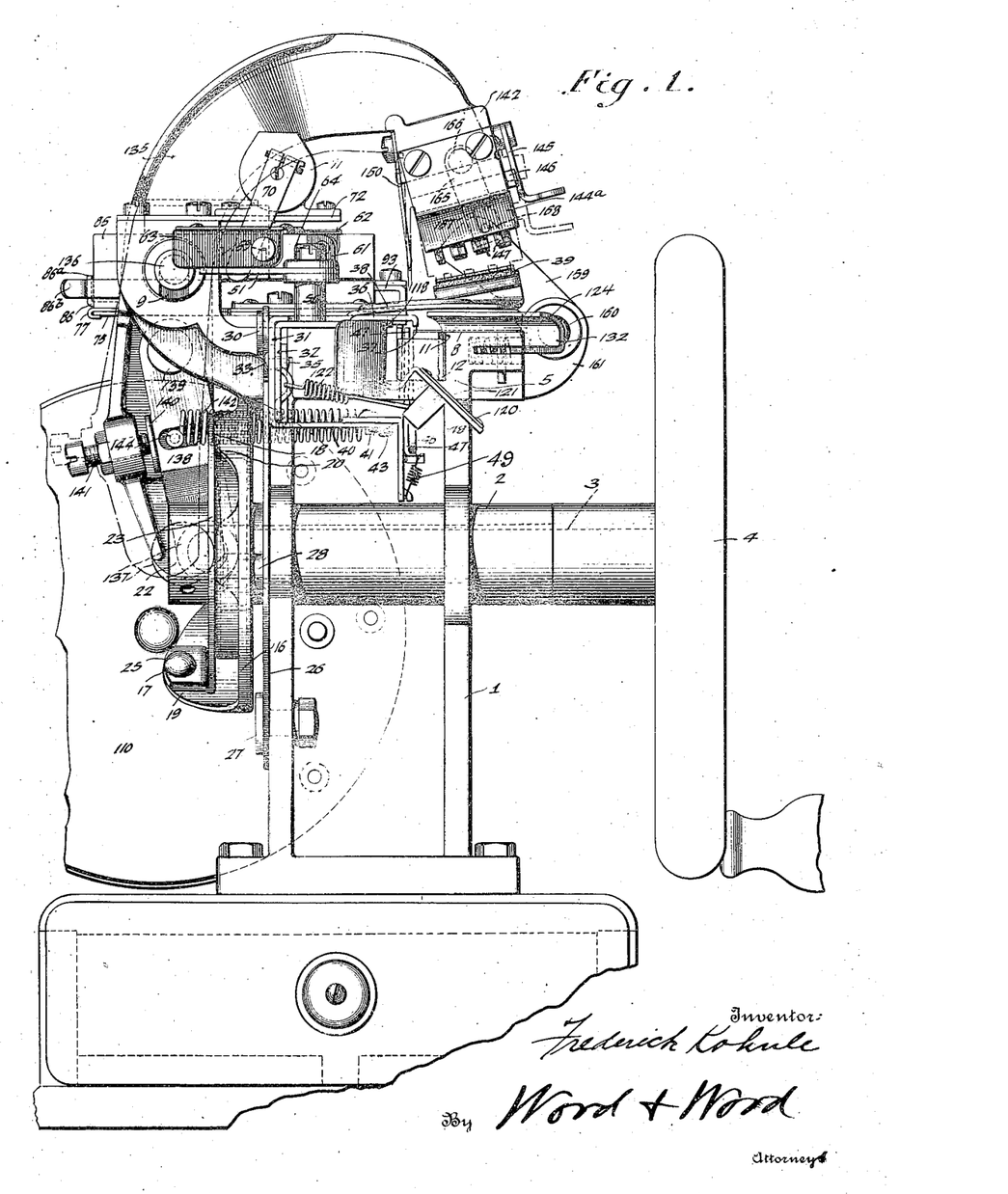
Figure 1 is an end elevation with all covers removed, showing the machine set for feeding, printing and cutting pin-tags in cardboard strip form, illustrating the positions of the parts immediately after a cutting and printing operation, and further showing in dot-and-dash lines the inking position of the printing arm, and type-head carried thereby, with relation to inking pad.
Figures 7, 9, 10, 11:
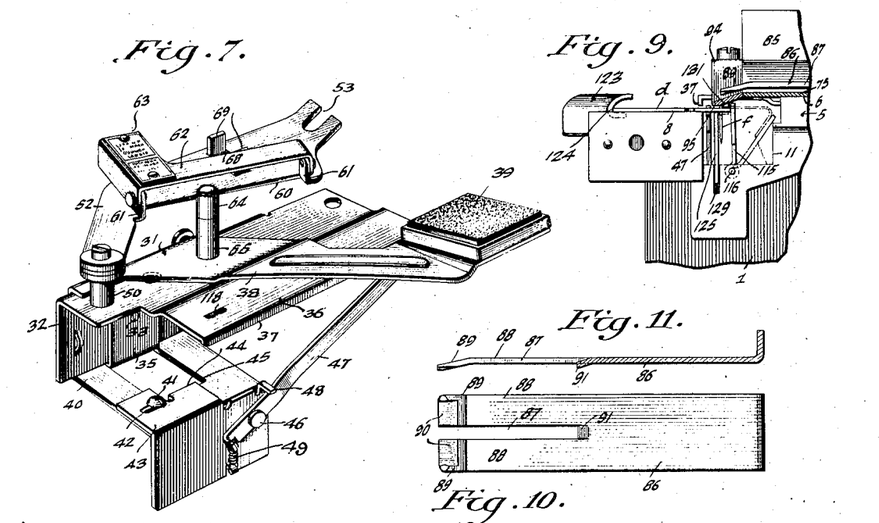
Figure 7 is a detached detail perspective view of the ribbon feed lever, inking pad arm and strip ticket feed pawl mounted upon their common reciprocable base.
Figure 9 is a fragmentary end view of the parts positioned in correspondence with those in Figure 8, and illustrating in dot-and-dash lines, the guide plate positioned as a guide for a second style of strip ticket.
Figures 10 and 11 are respectively a bottom plan, and a central section of the paper ribbon cover and tension device.
Figure 17:
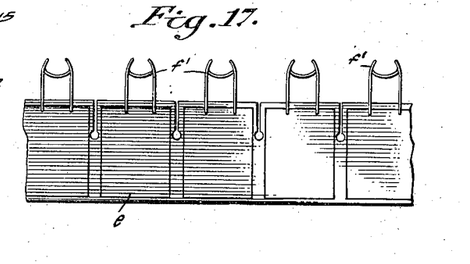
Figures 17 and 18 are respectively a plan of second style of cardboard ticket strip, and an edge view of the same.
Figure 18:
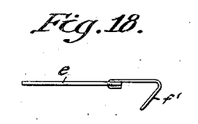

The guide and tension means for the cardboard strip are best illustrated in Figs. 3, 6, 8 and 9, the same being disposed at a right angle to the above described paper ribbon guide and designed to guide the various styles of ticket strips, two only of which are herein illustrated and respectively designated $d$, $e$, (see Figs. 8, 9, 17, 18), one having the staples $f$ attached adjacent one edge of the strip, one for each tag, and extending at right angles to the face of the strip, and the other having staples $f'$ similarly attached but extended horizontally beyond the edge of the strip and bent inwardly at an acute angle (see Figs. 17, 18). In order to accommodate the ticket strips of both forms, an adjustable guide is provided, comprising a plate 115 swingingly pivoted as at 116 within a floor opening of the groove 11 and designed to be adjusted either in a substantially vertical position or in a rearwardly slanting position, as shown in Fig. 9, respectively in full and dot-and-dash lines. The manner of adjusting the guide is best shown in Fig. 1. The guide is spring-pressed against a stop 118, projecting from the under surface of the apron 36. The outer end of the guide plate 115 is curved rearwardly, as shown, and adjacent the curved portion and as an extension of the lower edge of the plate is a guide operating finger-piece 120 having a depending lug 121 attached to which is a spring 122, the opposite end of which is engaged with a pressed-out attaching crimp of the plate 32. The spring, as shown in Fig. 1, lies below the pivotal point of the plate 115 and thus positively locks the guide in the position shown. When the guide is thrown rearwardly, as shown in dot and dash lines in Fig. 9, the spring will lie above the pivot and positively hold the guide in that position.

Figure 8:
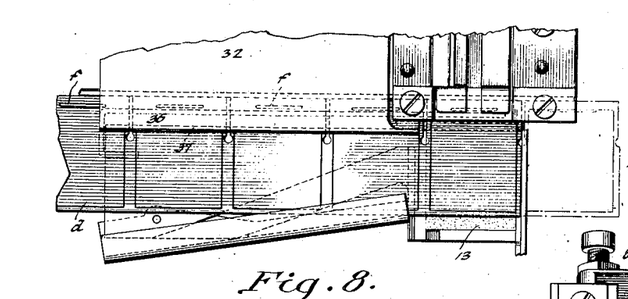
Figure 8 is a fragmentary plan showing a ticket strip as positioned for cutting and printing in correspondence with the position of the feed pawl of Figure 6.
Figure 12:
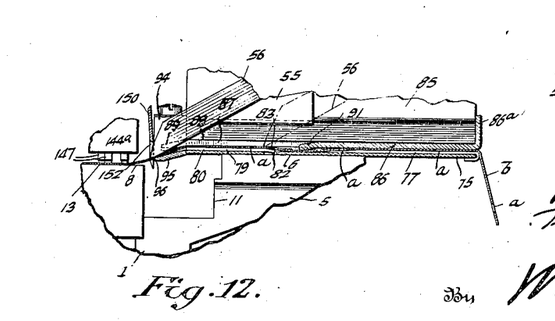
Figure 12 is a view similar to Figure 4, showing the paper ribbon positioned for cutting and printing, with the fully retracted position of the feed dog shown in dot-and-dash lines.
Figure 13:
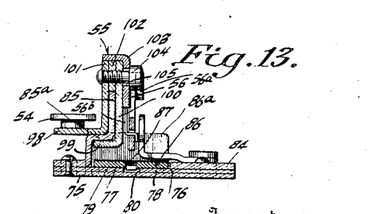
Figure 13 is a section on line 13—13, of Figure 4, illustrating the ribbon guide and reciprocable feed pawl carrier.
Figure 14:
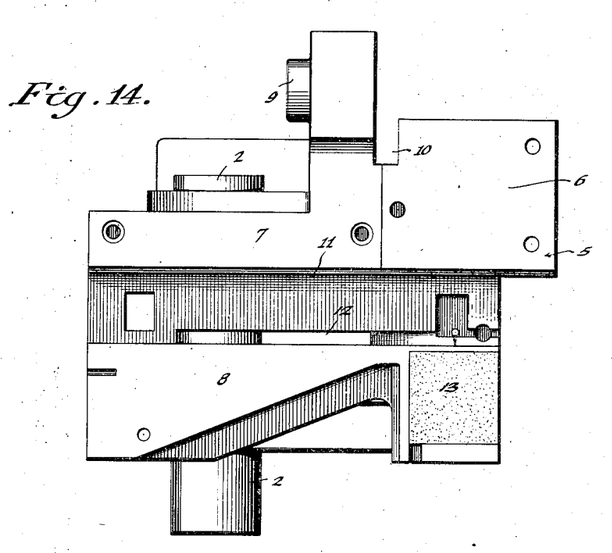
Figure 14 is a top plan view of the table, all machine elements having been removed.

A means is provided for causing the inner edge of the strip to positively engage the guide plate during feeding operation, which consists of a pivoted spring-pressed guide member 123, having its upper portion adjacent the platen 13 overturned to form a groove 124 with the surface 8, and designed to frictionally engage the outer end of the strip, as best shown in Fig. 9. The spring tension upon this guide is sufficient to cause slight frictional contact between the edges of the strip and to prevent raising of the strip from the surface 8. Figure 8 shows the strip $d$ positioned for feeding, the position of a severed tag being shown at the right hand end thereof in dot-and-dash lines. This view illustrates the position of the strip immediately after the severing of a tag with the feed pawl 47 in advanced position. Additional tension means 125 is adapted to engage the inner under surface of that part of the strip which overhangs the slot 11, between the staple $f$ and forward wall of said slot. This tension means 125 has the form (see Figs. 3 and 6), of a plate and is pivotally fastened to the table 5 by reverse bending, as shown at 126, the bent terminal 127 resting in a slot 128 of the table. The plate is supported at its opposite end adjacent the table 13 by a spring 129 stepped in an opening in the floor of the groove 11, the upper edge of the tension means vertically above the spring being normally in contact with the under surface of the depressed portion 95 of the stationary cutter 94. When the strip is inserted it is frictionally held between the forward end of the tension device and the lower surface of said stationary cutter, as best shown in Fig. 9, the upper surface of the strip being held slightly spaced from the lower surface of the stationary cutter by a small projection 131, on said cutter. The plate 75 is downwardly turned at one corner as at 132 to hold the outer end of the strip depressed, while being cut.

*Printing and cutting mechanism.*

The printing lever 135 is best illustrated in Figs. 1, 2, 3 and 4. Its pivot or journal 136 is engaged within the bearing 9 and is fastened therein against lateral displacement by a slotted retaining washer engaging a circumferential groove of the journal. The lever provides adjacent its end below its pivot, adjacent and at the rear of the base 1, a cam engaging roller 137, mounted at the lower extremity of a link 138 pivoted at 139 to the link and having midway of its length an outstanding ear 140 engageable by the end, a set screw 141 having threaded engagement with a laterally flanged portion of the lever. The screw and link 138 provide a means for adjusting the throw of the forward end of the printing lever conformably to the required degree of contact between the type, inking pad arm and platen. The roller is forced against the flange 16 by a spring 142 attached at one end to a pin 144, traversing a slot in the link 138 and stepped in the lever 135, and at the opposite end to the base 1.

The upper portion of the printing lever is of arcuate configuration and extends above and forwardly across the table. Formed at the forward extremity of the printing lever is a rectangular head 142 grooved in its bottom as at 143, the grooves in this instance being disposed in a direction crosswise of the machine and aligned with the platen and paper ribbon guide. At each side of the head is fastened a plate 144, which projects below the head and has inturned horizontal portions forming, with the lower end of the head, ways into which the guides of the type head 144ª are introduced. The type head is of a structure similar to that illustrated in my pending application, Serial No. 488,176, for tag marking machine, filed July 28, 1921, and therefore only a general description of its structure will be herein given.

The type head is held in printing position within the grooves by a pivoted latch 145 engaging a stop plate 146, this plate acting to limit the depth of insertion of the head within the grooves. The type head is provided with vertically disposed parallel type receiving slots, each slot having at one side a row of equally spaced vertical grooves extending thereacross from the top surface of the type head downwardly within said slots, the same stopping short of the bottom of the head to form a shoulder. The type insertable within the grooves, are indicated at 147.

The cams 20 and 19 alternately engage the roller 137 to depress the type-head respectively for an inking and printing, and cutting operation. The relations of the cams 20 and 19 to the feed groove 21 are such that the inking pad is withdrawn from beneath the head before the same is lowered for printing, at which time both knives are operated.

The knife 150, having a bevelled edge for cutting paper ribbon, is attached as by screws at the rear of the head 142 and is designed to springingly cooperate with the cutting edge 96 of the stationary knife 95, (see Fig. 4), at which time the knife is flexed as shown, thus bringing the cutting elements in positive contact and assuring a clean cut. The tags of the paper strip are not entirely severed by the knife, but, as shown in Figure 5, are cut through, adjacent their outer edges, as shown at $g$, and centrally at each side of an opening $b$ as shown at $h$, leaving unsevered connecting portions $i$ between cuts $h$ and $g$. The lower edge of the knife 150 is of substantially V-shaped formation to obtain a shearing cut, (see Fig. 2), and extending upwardly from its lower edge has a central slot 152 of slightly less width than the openings $b$. Symmetrically at each side of said slot 152 are provided relatively narrow slots 153 which function for forming the connecting portions $i$ as above described.

The knife 159, for cutting cardboard strips is pivoted as at 160 to a stationary cutter plate 161 attached as by a screw at the end of the surface 8 adjacent the platen 13, the said knife 159 being actuated for cutting the strip as the printing arm moves downwardly for a printing operation. The actuation of the knife is accomplished by its slotted attachment with a link 165 pivoted as at 166 to the plate 144. The action of the knife is best shown in Figs. 1 and 4, Fig. 1 showing the normal position of the knife when the printing arm is in its uppermost position preparatory to inking the type. As the arm travels downwardly, the upper end of the slot 167 engages the pin 168 mounted upon the knife, and partly depresses the knife as shown in Fig. 4, after which, upon a continued downward movement of the printing arm, the upper edge of the knife is engaged by the inturned portion of the plate 144 to further depress the knife to its limit. When the arm travels upwardly, the lower end of the slot 167 again engages the pin and raises the knife to a position shown in Fig. 1. It will be seen that by this construction, a single arm actuates both knives positioned adjacent a common platen, thus making possible a feeding in directions at right angles to each other of both cardboard strips and paper ribbon.

Substitute type heads are provided having the type set therein conformably to requirements for the marking respectively of paper ribbon tags or labels, and cardboard strip tags.

Having described my invention, I claim:

1. In a device of the class described, relatively right angularly disposed co-planar strip confining guides, a platen at the intersection of said guides aligned therewith, and means for feeding strip material from said guides to said platen.

2. In a device of the class described, relatively right angularly disposed co-planar strip confining guides, a platen at the intersection of said guides, means for feeding strip material from said guides to said platen, and means for printing and cutting said material while disposed thereon.

3. In a device of the class described, a base, a reciprocable printing member thereon, a platen engageable by said printing member, guides aligned with said platen, means reciprocable for feeding material from said guides to, over and upon said platen, a pivoted lever engageable with one of said reciprocable feeding means, a pin attached to the other reciprocable feeding means, a notch in said lever engageable by said pin, and an adjustable wall-forming member adapted to be turned to form with said notch a closed slot about said pin.

4. In a device of the class described, a pivoted member having a guiding edge, a translatable member having a projection thereon engageable with said guiding edge, and a latch member cooperable with said edge to form therewith a closure about said projection.

5. In a device of the class described, a base, a pivoted element thereon having a recess at one edge, a translatable member having a projection thereon, said projection engageable with said recess, a latch member pivoted to said pivoted element cooperable with said recess to form a closure about said projection, and means for oscillating said translatable member.

6. In a device of the class described, relatively right angularly disposed guides, a platen at the intersection thereof, means for feeding material to said platen from said guides, printing means cooperable with said platen for printing said material, inking means movable with said feeding means and cooperable with said printing means, and means for obtaining timed coordination between said printing and inking means and said platen.

7. In a device of the character described, a platen for receiving tag length sections of strips, a printing head movable above the platen for printing upon a tag section disposed upon the platen, angularly disposed tag strip confining guides co-planar with the platen for guiding respective tag strips to and upon the platen from relative angular directions, whereby different forms of tags may be alternately fed to the platen and beneath the printing head and strip feeding means respectively for each guide.

8. In a device of the character described, a platen for receiving tag length sections of strips, a printing head movable above the platen for printing upon a tag section disposed upon the platen, angularly disposed tag strip confining guides co-planar with the platen for guiding respective tag strips to and upon the platen from relative angular directions, reciprocable strip feeding carriages respectively for said guides, a rocking member for actuating one of said carriages adapted to be connected with the second carriage for rocking said member to actuate its carriage in stroke directions alternately to the second carriage, whereby the strips in said guides may be respectively alternately fed to the platen.

9. In a device of the class described, a reciprocable printing member, a platen engageable by said printing member, guides aligned with said platen, means for feeding material from said guides to said platen, said means comprising a rotating cam providing projections engageable with said printing member, and a groove for oscillating said feeding means, and means for connecting and disconnecting said feeding means.

10. In a device of the class described, paper guiding tables, at right angles to one another, translatable feed members, one for each guide table, a pivoted lever providing a guiding edge, a projection on one of said translatable feed members engageable with said edge, and means upon said lever adapted to cooperate with said edge to enclose said projection.

11. In a device of the class described, relatively right angularly disposed horizontal guides, translatable strip feeding members, one for each guide, a platen aligned with said guide, an inking pad carried by one of said translatable feed members, a pivoted lever providing a guiding edge, a pin on one of said translatable feed members engageable with said edge, means upon said lever adapted to cooperate with said edge and close said projection, a printing member cooperable with said pad at the end of a feed stroke and cooperable with said platen at the end of a retreat stroke, and means for causing timed coordination between said printing member and between said inking pad and said platen.

12. In a device of the class described, paper guiding tables, translatable strip feeding members, one for each table, a pivoted lever providing a guiding edge, a pin on one of said translatable feeding members engageable with said edge, and means upon said lever adapted to cooperate with said edge to enclose said projection.

13. In a device of the class described, a table having guides for tracking a tag strip, a translatable member for feeding material along one of said guides, a second translatable member for feeding material along the other guide at right angles to said first-mentioned guide, a lever pivoted to said table and operatively connected with said second translatable member, said lever having a recess, a pin on one of said translatable members engageable within said recess, and an element attached to said lever adapted to be swung to form with said recess a closed slot about said projection.

14. In a device of the class described, relatively right angularly disposed horizontal guides, a platen in alignment with said guides, an inking pad reciprocable lengthwise of one of said guides and aligned with said platen, a pawl movable with said inking pad for feeding material along said guide, a printing member cooperable with said pad at the end of a feed stroke, and cooperable with said platen at the end of a retreat stroke, and means for causing timed coordination between said printing member and said inking pad and platen.

15. In a device of the class described, a table for tracking a tag strip, a translatable member for feeding material along said table, a second translatable member for feeding material along said table at right angles to said first mentioned feed, a lever pivoted to said table operatively connected with said second translatable member, said lever having a recess, a pin on one of said translatable members engageable within said recess, and a wall forming element attached to said lever, adapted to be swung to form with said recess a closed slot about said projection.

16. In a device of the class described, a base, a swinging element pivoted thereto and having a recess at one edge, a translatable member having a projection thereon engageable with said recess, and an element pivotally attached upon said swinging element, adapted to be swung to a position to form with said recess a closed slot about said projection.

17. In a device of the class described, a swinging element having a recess at one edge, a translatable member having a projection thereon engageable within said recess, and an element pivotally attached to said swinging element adjacent said recess, adapted to be swung to a position to form with said recess a closed slot about said projection, whereby said projection is slidably engaged therein to oscillate said swinging element when said translatable element is oscillated, and means for oscillating said translatable member.

18. In a device of the class described, a guide for confining and tracking paper ribbon, comprising a base plate having aligned openings therein, intermediate plates attached to said base, formed and spaced to define in conjunction therewith relatively narrow and broad co-linear co-planar depressions, each intermediate plate having a portion projected into one of said openings, cap plates overlying said intermediate plates defining therewith a depression adapted to receive a paper strip, and a tension element adapted to rest upon the paper strip, said plate having a slot in register with said narrow depression defined by said intermediate plates, and having a tongue at one end of said slot, adapted to lie adjacent said projected portions to depress the strip, and means for yieldingly locking said tension element.

19. In a device of the class described, a platen, guides aligned therewith relatively right angularly disposed with respect to each other, means for feeding strip material from said guides to said platen, printing means coactible with said platen, and means mounted upon and operable by said printing means for cutting respective strips in tag lengths.

20. In a device of the class described, a platen, guides leading to said platen, said guides being relatively right angularly disposed, a printing head engageable with said platen, a knife upon said head coactible with one of said guides for cutting a respective strip, a movable knife connected to said platen, and a link connected with said knife and with said printing head, whereby the depression of said head operates both knives to cut said strip.

21. In a device of the class described, a guide for confining and tracking paper ribbon, comprising a base plate having a pair of aligned openings adjacent one end and spaced apart, a pair of plates attached to said base plates formed and spaced apart to define relatively narrow and broad depressions therebetween, each plate having an inner portion bent and projecting into one of said openings, additional plates upon said first-mentioned plates attached thereto and defining a ribbon receiving depression and adapted to receive a ribbon or strip, a tension element adapted to rest upon the ribbon and bridge said depressions, said plate having a slot in register with said narrow depression, and having a tongue at the end of said slot adapted to lie adjacent said bent portions to depress said strip against said inclined portions, and means for locking said tension element.

In witness whereof, I hereunto subscribe my name, as attested by the two subscribing witnesses.

FREDERICK KOHNLE.

Witnesses:
R. KISTNER.
L. A. BECK.